United States Patent
Xu

(10) Patent No.: US 10,668,442 B1
(45) Date of Patent: *Jun. 2, 2020

(54) HYDROPROCESSING REACTOR INTERNALS HAVING REDUCED HEIGHT

(71) Applicant: UOP LLC, Des Plaines, IL (US)

(72) Inventor: Zhanping Xu, Inverness, IL (US)

(73) Assignee: UOP LLC, Des Plaines, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/270,053

(22) Filed: Feb. 7, 2019

(51) Int. Cl.
*B01J 8/04* (2006.01)
*B01J 8/00* (2006.01)
*C10G 47/30* (2006.01)
*C10G 45/00* (2006.01)

(52) U.S. Cl.
CPC ............ *B01J 8/0492* (2013.01); *B01J 8/001* (2013.01); *B01J 8/0453* (2013.01); *C10G 45/00* (2013.01); *C10G 47/30* (2013.01); *B01J 2208/00008* (2013.01); *B01J 2208/00849* (2013.01); *B01J 2208/00938* (2013.01)

(58) Field of Classification Search
CPC ...... B01J 8/0492; B01J 8/0496; B01J 8/0453; B01J 8/001; B01J 2208/00849; B01J 2208/00938
See application file for complete search history.

(56) References Cited

U.S. PATENT DOCUMENTS

| | | |
|---|---|---|
| 5,635,145 A | 6/1997 | Den Hartog et al. |
| 5,837,208 A | 11/1998 | Grott et al. |
| 5,935,413 A | 8/1999 | Boyd et al. |
| 6,183,702 B1 | 2/2001 | Nguyen et al. |
| 6,984,365 B2 | 1/2006 | Nelson et al. |
| 7,078,002 B2 | 7/2006 | Van Vliet et al. |
| 7,112,312 B2 | 9/2006 | Chou |
| 7,601,310 B2 | 10/2009 | Breivik et al. |
| 8,017,095 B2 | 9/2011 | Kemoun et al. |
| 8,181,942 B2 | 5/2012 | Sechrist |
| 8,673,246 B2 | 3/2014 | Chen et al. |
| 9,079,141 B2 | 7/2015 | Boyak et al. |
| 9,211,516 B2 | 12/2015 | Lesniak et al. |
| 9,295,959 B2 | 3/2016 | Xu et al. |
| 9,321,022 B2 | 4/2016 | Xu |
| 9,321,023 B2 | 4/2016 | Xu |
| 9,566,559 B2 | 2/2017 | Xu et al. |
| 9,757,703 B2 | 9/2017 | Zahirovic et al. |
| 9,764,299 B2 | 9/2017 | Beard et al. |
| 2011/0123410 A1 | 5/2011 | Augier et al. |
| 2014/0144121 A1 | 5/2014 | Legare et al. |
| 2014/0231308 A1 | 8/2014 | Muller |

(Continued)

FOREIGN PATENT DOCUMENTS

| | | |
|---|---|---|
| CA | 2887392 A1 | 4/2014 |
| CN | 107405591 A | 11/2017 |

(Continued)

*Primary Examiner* — Lessanework Seifu

(57) ABSTRACT

The hydroprocessing reactor internals (HRI) have reduced height compared to standard HRI designs. The HRI height reduction is achieved by a more open design of a rough liquid distribution tray so that the required spaces above and below the tray for vapor flow are reduced. The hydroprocessing reactor quench zone internals comprise a collection tray, a rough liquid distribution tray, and a vapor-liquid distribution tray. Fluid mixing occurs above both the collection tray and the rough liquid distribution tray.

18 Claims, 5 Drawing Sheets

(56) References Cited

U.S. PATENT DOCUMENTS

| | | |
|---|---|---|
| 2015/0071834 A1 | 3/2015 | Korsten et al. |
| 2017/0173547 A1 | 6/2017 | Maas et al. |
| 2018/0057757 A1 | 3/2018 | Song et al. |

FOREIGN PATENT DOCUMENTS

| | | |
|---|---|---|
| WO | 2014056935 A1 | 4/2014 |
| WO | 2016155938 A1 | 10/2016 |

US 10,668,442 B1

HYDROPROCESSING REACTOR INTERNALS HAVING REDUCED HEIGHT

BACKGROUND

A wide variety of processes use co-current flow reactors, where a fluid or fluids flow over a solid bed of particulate materials, to provide for contact between the fluid and solid particles. In a reactor, the solid may comprise a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, hydrocracking and hydrotreating.

Co-current reactors with fixed beds are constructed such that the reactor allows for the fluid to flow over the catalyst bed. When the fluid is a liquid, a vapor, or liquid and vapor mixture, the fluid is usually directed to flow downward through the reactor. Multibed reactors are also frequently used, where the reactor beds are stacked over one another within a reactor shell. Typically, they are stacked with some space between the beds.

The interbed spaces are often created to provide for intermediate treatment of the process fluid, such as cooling, heating, mixing and redistribution.

In exothermic catalytic reactions, the control of fluid temperature and distribution is important. The temperature and composition of the fluids from an upper catalyst bed and from outside of reactor should be well mixed before being distributed to the lower catalyst bed. Initial poor temperature and composition distribution at top of a catalyst bed can persist or grow as the process fluids move down the reactor. Hot spots can develop and cause rapid deactivation of the catalyst and shorten the reactor operation cycle length. The space between catalyst beds is for the injection of a quench gas or liquid and for fluid mixing and distribution. In hydrocarbon processing, the quench gas is often a cool hydrogen/hydrocarbon stream. However, cooling a fluid without controlling the mixing and distribution leads to uneven reactions and uneven temperature distribution in subsequent reactor beds. And complex mixing and distribution systems takes up valuable space in a reactor chamber holding multiple catalyst beds.

There is always a desire for minimizing the space between reactor beds for introducing a quench fluid and mixing the vapor and liquid along with the quench fluid. Particularly, for existing hydroprocessing reactors, it is often desired to reduce the space between catalyst beds for increasing catalyst loading so that the reactor throughput or operating cycle time or both can be increased. Even for new reactors, it is often desired to reduce the overall size of the reactors to reduce capital expenditure and the profile of the reactor in a processing plant. Therefore, it is desirable to provide for good mixing and distribution of fluids between adjacent catalyst beds in a relatively short interbed space.

The design of reactors to overcome these limitations can save significantly on the valuable space within a reactor for maximizing catalyst loading. Further, it is often desirable to revamp existing reactors to improve processes with the same or reduced quench zone space between catalyst beds. New reactor internals that improve the utilization of the space within a reactor shell can provide significant cost savings, and allow for revamps of existing reactors to meet new operational and regulatory requirements.

DESCRIPTION OF THE INVENTION

Figure 1:
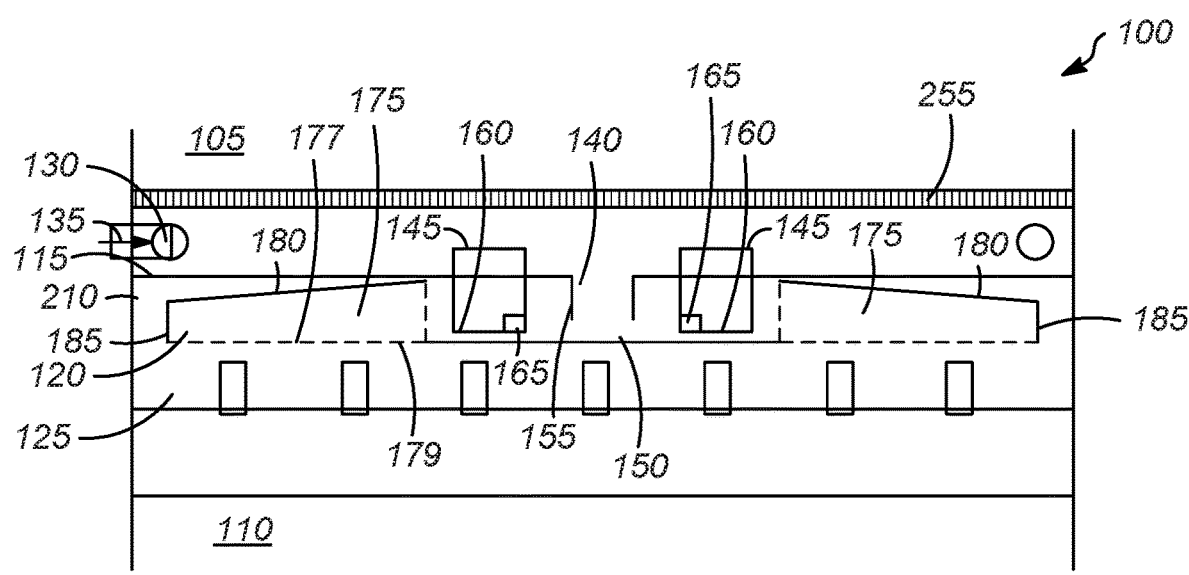
FIG. 1 is a cross section of one embodiment of the hydroprocessing reactor internals of the present invention.

Minimizing hydroprocessing reactor internals (HRI) height and maximizing catalyst loading in revamp of existing reactors helps to increase production rate and/or operation cycle length which improves the economics of the process. In this design, HRI height reduction is achieved by a more open design of a rough liquid distribution tray so that the required spaces above and below the tray for fluid flow are reduced.

The hydroprocessing reactor quench zone internals comprise a collection tray, a rough liquid distribution tray, and a vapor-liquid distribution tray. In some embodiments, fluid mixing occurs above both the collection tray and the rough liquid distribution tray without a dedicated mixing chamber.

The collection tray has a central opening for downward fluid flow and, in some embodiments, one or more chimneys around the central opening for downward vapor flow. A ring distributor above collection tray introduces quench fluid to the collection tray. The collection tray is in fluid communication with the bottom of the upper catalyst bed.

The rough liquid distribution tray comprises a central pan and multiple fluid distribution troughs attached to the pan that extended radially outwards with the outer end close to the reactor shell. The fluid distribution trough bottom has holes for liquid flow to the vapor-liquid distribution tray below. The fluid distribution trough has two side walls sloped from the central pan to the outer end and an end wall for retaining liquid within the fluid distribution trough for liquid distribution. Vapor leaves the fluid distribution trough from top of the walls and flows down to the vapor-liquid distribution through the open spaces between the fluid distribution troughs and between the fluid distribution troughs and reactor shell.

Quench gas is injected from the ring distributor above collection tray and mixed with process vapor and liquid from the upper catalyst bed. Fluid is mixed on the collection tray and further in a single central opening. In some embodiments, there is a downcomer attached to the central opening. The downcomer is terminated above the central pan of the rough liquid distribution tray.

When vapor chimneys are present, quench gas and process vapor are mixed above the collection tray and within the vapor chimneys. All fluids are further mixed in the central pan by injecting mixed gas and vapor from the bottom of the chimneys into the liquid in the central pan. Vapor and liquid then flow horizontally to the fluid distribution troughs that are attached to the central pan. Liquid is distributed down to the vapor-liquid distribution tray through holes in the bottom of the troughs, while vapor flows through the spaces between the troughs.

One aspect of the invention is a device for the mixing and distribution of fluid between catalyst beds. In one embodiment, the device comprises a collection tray comprising a central opening, the collection tray in fluid communication with a bottom of an upper catalyst bed. There is a rough liquid distribution tray comprising a central pan in fluid communication with the central opening of the collection tray and a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the central pan to the end wall, the bottom of the fluid distribution troughs having openings therethrough, the end wall being spaced apart from a reactor wall. There is a vapor-liquid distribution tray in fluid communication with the rough liquid distribution tray and with a top of a lower catalyst bed.

In some embodiments, there is a space between adjacent fluid distribution troughs at the central pan, and wherein the space is closed by a plate.

In some embodiments, the width of the fluid distribution troughs at the central pan is greater than the width of the fluid distribution troughs at the end wall.

In some embodiments, the width of the fluid distribution troughs at the central pan is less than the width of the fluid distribution troughs at the end wall. In some embodiments, the fluid distribution troughs are less than 24 in. wide.

In some embodiments, the device further comprises a ring distributor comprising an injector for injecting quench fluid into a space above the collection tray.

In some embodiments, the injector is directed inwardly substantially perpendicular to the ring distributor or the injector is directed tangential to the ring distributor.

In some embodiments, the device further comprises a mixing chamber above the collection tray, the mixing chamber having an inner wall and an outer wall, the inner wall positioned around the central opening, the outer wall located at a position inward of the injectors, and the outer wall having a spillway.

In some embodiments, the device further comprises a vapor chimney for vapor flow positioned radially outwardly of the central opening.

In some embodiments, the vapor chimney extends above and below the surface of the collection tray, and wherein the vapor chimney has an upper opening above the normal operation liquid level of the collection tray and a lower opening in a lower portion of the vapor chimney.

In some embodiments, the vapor chimney has a side and a closed bottom, the lower opening being in the side adjacent to the bottom of the vapor chimney.

In some embodiments, the vapor chimney has an open bottom and is terminated adjacent to a lower surface of the collection tray.

In some embodiments, a cross section of the vapor chimney is triangular.

In some embodiments, there are a plurality of vapor chimneys arrayed circumferentially around the central opening to form fluid-flow passageways therebetween.

In some embodiments, the vapor chimney has an inner wall adjacent to central opening and an outer wall spaced apart from the central opening and wherein a height of the inner wall is less than a height of the outer wall.

In some embodiments, the vapor chimney is positioned above the collection tray.

In some embodiments, the vapor chimney has an inner wall adjacent to central opening and an outer wall spaced apart from the central opening and a width of the inner wall is less than a width of the outer wall.

In some embodiments, the device further comprises a downcomer attached to the central opening and wherein a bottom of the downcomer is above the central pan.

In some embodiments, the device of claim 1, further comprising at least one of: a sensor positioned at a location to sense at least one parameter; a transmitter; or a computing device to receive data, analyze data, transmit data, or combinations thereof.

Another aspect of the invention is a device for the mixing and distribution of fluid between catalyst beds. In one embodiment, the device comprises a collection tray comprising a central opening, the collection tray in fluid communication with a bottom of an upper catalyst bed. There is a vapor chimney for vapor flow positioned radially outwardly of the central opening; a ring distributor comprising an injector for injecting quench fluid into a space above the collection tray. There is a rough liquid distribution tray comprising a central pan in fluid communication with the central opening of the collection tray and a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the central pan to the end wall, the bottom of the fluid distribution troughs having openings therethrough, the end wall being spaced apart from a reactor wall. There is a vapor-liquid distribution tray in fluid communication with the rough liquid distribution tray and with a top of a lower catalyst bed.

As shown in FIG. 1, the quench zone HRI 100 is between the bottom of upper catalyst bed 105 and the top of the lower catalyst bed 110. It includes the collection tray 115, the rough liquid distribution tray 120, and the vapor-liquid distribution tray 125. The rough liquid distribution tray 120 comprises a central pan 150 and fluid distribution troughs 175 attached to the central pan 150.

Figure 2:
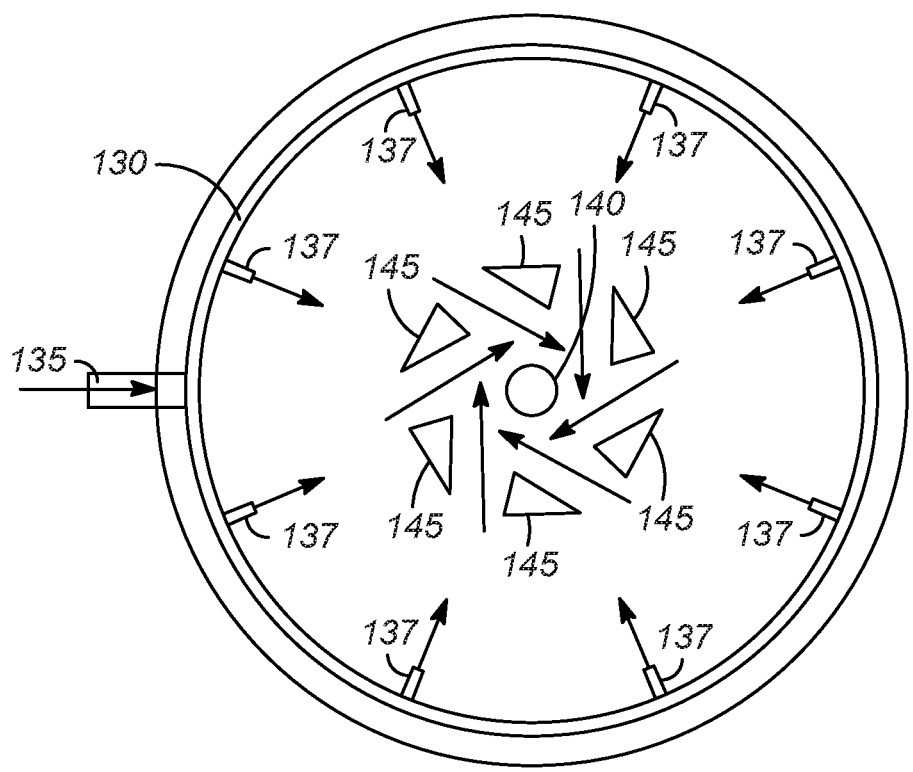
FIG. 2 is a top view of one embodiment of the collection tray and ring distributor of the present invention.

The ring distributor 130 is used for injecting quench fluid 135 into the space above collection tray 115 for contacting with downflow process vapor and liquid from the upper catalyst bed 105. As shown in FIG. 2, the injectors 137 are directed inwardly substantially perpendicular to the ring distributor 130. In some embodiments, the injectors 137 are directed tangential to the ring distributor 130.

Figure 7:
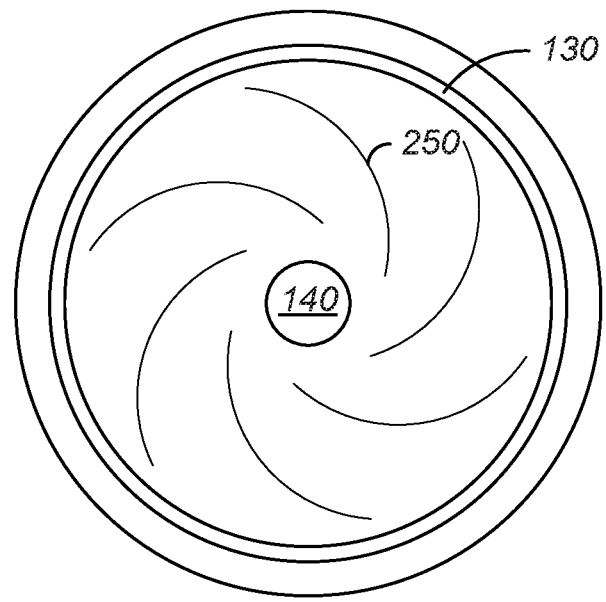
FIG. 7 is a top view of one embodiment of a collection tray with baffles thereon.

All fluids flow towards center of the collection tray 115 for mixing. Fluid flows down through a central opening 140 in the collection tray 115. One or more curved baffles 250 as shown in FIG. 7 may be installed on the collection tray 115 between the ring distributor 130 and the central opening 140 for inducing a rotation fluid flow at the central opening 140 to facilitate fluid mixing. The baffles 250 can extend upward from the collection tray 115 toward the catalyst support grid 255. In some embodiments, both the vapor and the liquid flow down through the central opening 140. In other embodiments as shown in FIG. 1, most of the vapor flows through one or more vapor chimneys 145 around the central opening 140, and most of the liquid flows through the central opening 140. Where the vapor chimneys 145 are present, they can extend a couple of inches above the collection tray 115 so that liquid flows preferentially through the central opening 140 for mixing, and vapor flows through the vapor chimneys 145. The vapor chimneys 145 can be arranged in such a way that some liquid mixing occurs before liquid enters into the central opening 140 as shown in FIG. 2.

In some embodiments, a certain pressure drop (e.g., about 3.5 kPa or 0.5 spi) is designed to occur mostly through narrow slots 165 near the bottom 160 of the vapor chimneys 145 so that the high vapor exit velocity creates turbulent contact with liquid in the central pan 150 of the rough liquid distribution tray 120. When the vapor chimneys 145 are present, the central opening 140 and the vapor chimneys 145 are designed such that most of the liquid flows through central opening 140, and most of the mixed gas and vapor flows through the vapor chimneys 145 on the collection tray 115.

Figure 3:
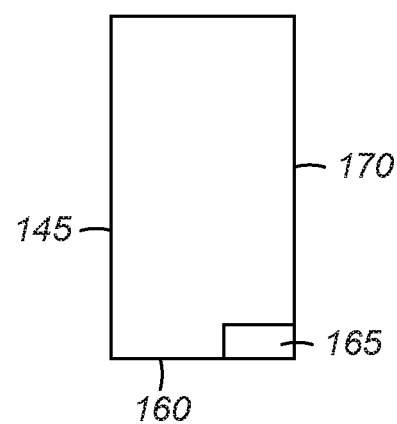
FIG. 3 is a top view of one embodiment of the vapor chimneys of the present invention.

When a downcomer 155 is present, it is attached to the collection tray 115 at the central opening 140 and is terminated above the bottom of the rough liquid distribution tray 120 in order to discharge liquid to the center of the central pan 150 on the rough liquid distribution tray 120. The vapor chimneys 145 attached to the collection tray 115 may extend down close to the top surface (e.g., as low as about 0.5" above) of the central pan 150 to as high as at the lower surface of the collection tray 115. In some embodiments as shown in FIG. 3, the bottom 160 of the vapor chimneys 145 is closed. There are slots 165 in the side 170 of the vapor chimney 145 near the bottom 160 for injecting mixed gas and vapor into the liquid in the central pan 150 so that the exit vapor velocity and direction can be controlled. When triangular vapor chimneys 145 are used, the vapor can exit the triangular vapor chimneys 145 in a horizontal direction so that a rotation of the flow of fluids is created within the central pan 150 for further fluid mixing and heat transfer.

Figure 4:
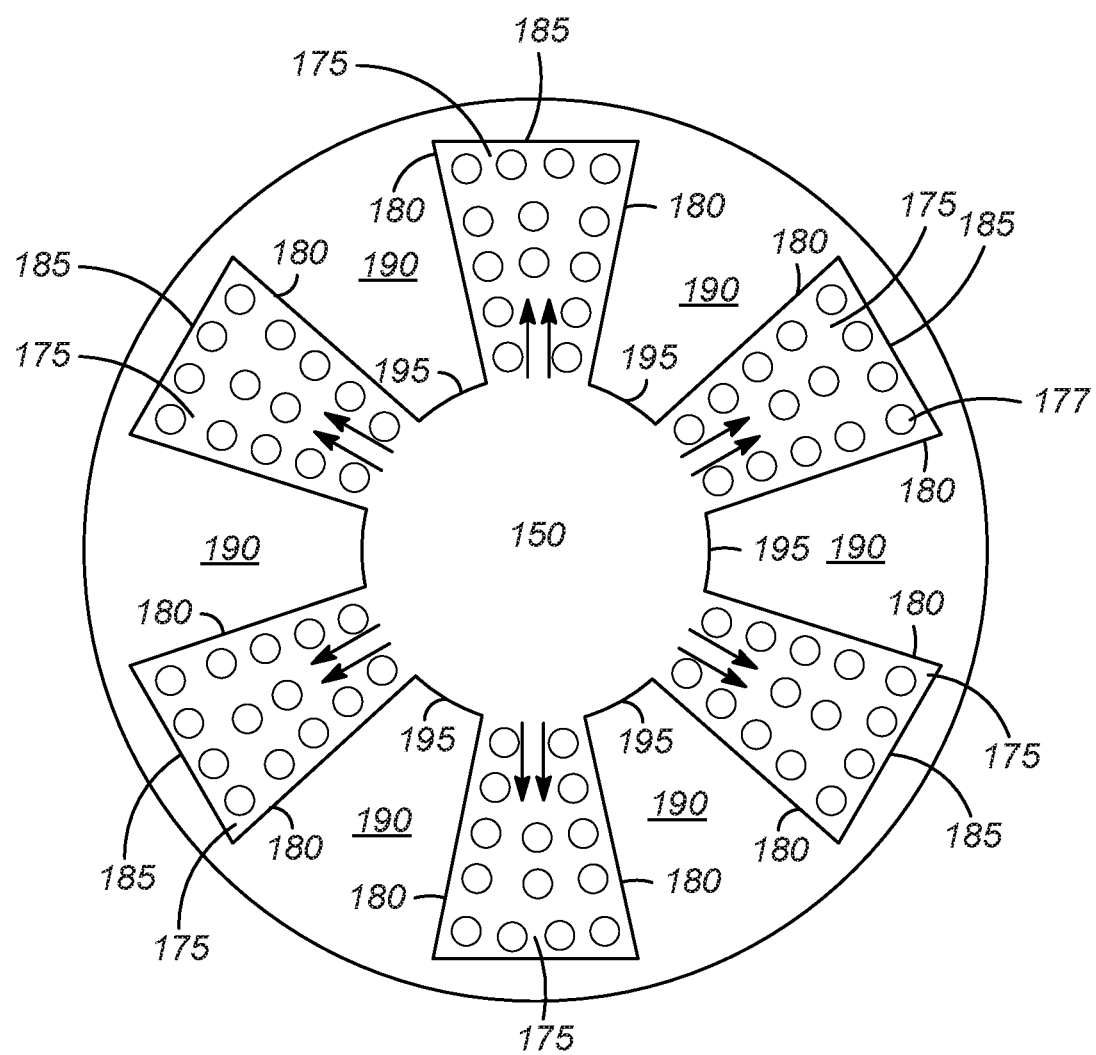
FIG. 4 is a top view of one embodiment of the rough liquid distribution tray of the present invention.

As shown in FIG. 4, the mixed fluids then enter into the fluid distribution troughs 175 attached to the central pan 150 for distribution. Liquid flows down to the vapor-liquid distribution tray 125 through holes 177 in the bottom plate 179 of the fluid distribution troughs 175, and vapor (gas) flows over the top of the side walls 180 and the end walls 185, as well as the spaces 190 between the fluid distribution troughs 175.

If there would be any gaps between adjacent fluid distribution troughs 175 on the end attached to the central pan 150, the gaps are closed with a plate 195 so that fluids exiting the central pan 150 can only flow into the fluid distribution troughs 175 for distribution to vapor-liquid distribution tray 125 below.

Figure 5:
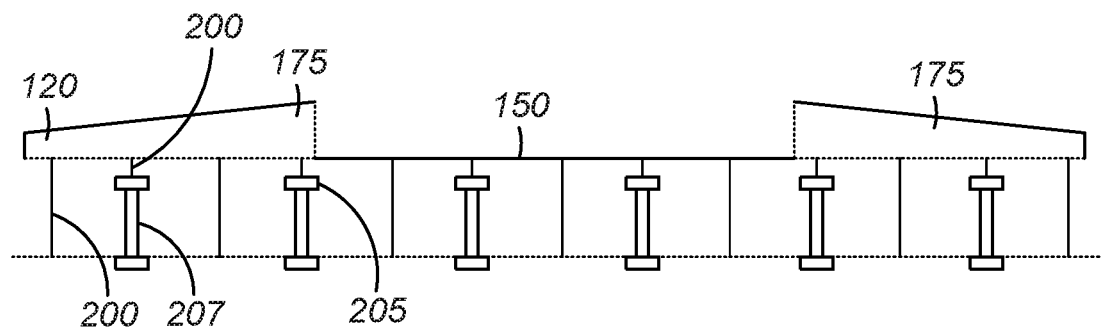
FIG. 5 is a side view of one embodiment of the supports for the troughs of the rough liquid distribution tray.

The fluid distribution troughs 175 can be any suitable size and shape. Narrow fluid distribution troughs 175 (e.g., less than 24 inches) can be designed for passing through the manway in the reactor for easy installation with minimal sealing required. The narrow fluid distribution troughs 175 are rigid and can be supported with rods 200 attached to the decks and the top flanges 205 of support beams 207 for the vapor-liquid distribution tray 125 as shown in FIG. 5. The fluid distribution troughs 175 may be spaced a short distance (e.g., 0.25 to 0.5 inches) above the top of the beam flanges 205 so that the holes 177 on the bottom plates 179 of the fluid distribution troughs 175 are not blocked, and little splashing of liquid will be created when the liquid falls onto the top of the beam flanges 205. Multiple narrow fluid distribution troughs 175 also reduce the velocity of the vapor exiting from the fluid distribution troughs 175 through the clearance above the side walls 180 of the fluid distribution troughs 175, minimizing the height of the fluid distribution troughs 175 and the rough liquid distribution tray 120 and the space between the rough liquid distribution tray 120 and the vapor-liquid distribution tray 125 below.

Figure 6A:
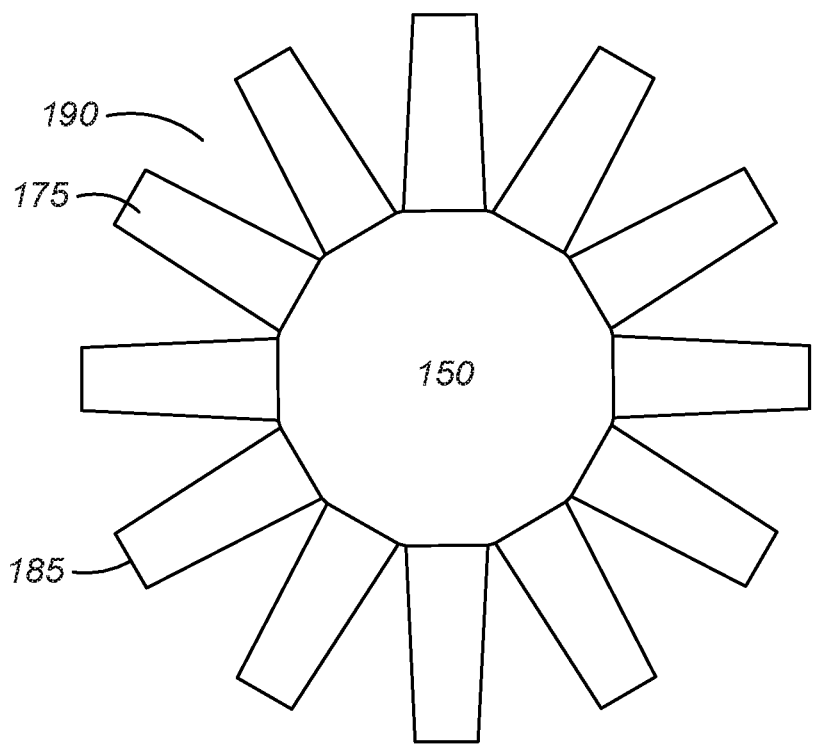
FIGS. 6A and 6B are alternate embodiments of the rough liquid distribution tray of the present invention.
Figure 6B:
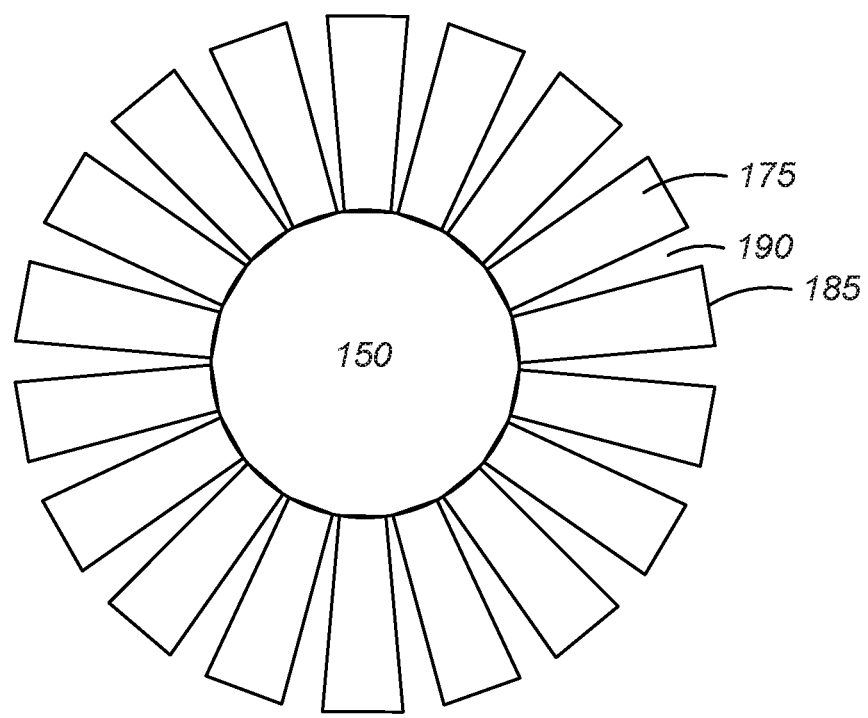

The number, size, and shape of the fluid distribution troughs 175 can be designed for accommodating various vapor and liquid flow rates. For example, in FIG. 6A, the width of the fluid distribution trough 175 at the end wall 185 is less than the width of the fluid distribution trough 175 at the central pan 150. In FIG. 6B, the width of the fluid distribution trough 175 at the end wall 185 is greater than the width of the fluid distribution trough 175 at the central pan 150.

In the embodiment shown in FIGS. 1 and 3, the vapor chimneys 145 are attached to collection tray 115 and extended down close to the top surface of central pan 150. The chimney bottom 160 is closed, and it has slots 165 on the side 170 near the bottom 160 for injecting mixing gas and vapor horizontally into liquid in the central pan 150 and create a swirling flow of the fluids above the central pan 150 for enhancing fluid mixing and heat transfer.

The fluid distribution troughs 175 are constructed with a bottom perforated plate 179, sloped side walls 180, and an end wall 185. The end attached to the central pan 150 is open so that the fluid mixture can enter the fluid distribution trough. The side walls 180 are sloped from a height close to the spacing between the rough liquid distribution tray 120 and the collection tray 115 (e.g., if the spacing between the trays is 6 inches, the side walls 180 will be about 5.75 inches) on the side attached to central pan 150 to about 1 to 3 inches at the end wall 185 close to the reactor shell 210. Typically, the height of the end wall 185 of the fluid distribution trough 175 is the same as the side walls 180 where they meet.

The description of the process and apparatus of the prior art and this invention are presented with reference to the attached Figures. The Figures are simplified diagrams of the prior art and various embodiments of the present invention and are not intended as an undue limitation on the generally broad scope of the description provided herein and the appended claims. Certain hardware such as valves, pumps, compressors, heat exchangers, instrumentation and controls, have been omitted as not essential to a clear understanding of the invention. The use and application of this hardware is well within the skill of the art.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Specific Embodiments

While the following is described in conjunction with specific embodiments, it will be understood that this description is intended to illustrate and not limit the scope of the preceding description and the appended claims.

A first embodiment of the invention is an apparatus for the mixing and distribution of fluid between catalyst beds comprising a collection tray comprising a central opening, the collection tray in fluid communication with a bottom of an upper catalyst bed; a rough liquid distribution tray comprising a central pan in fluid communication with the central opening of the collection tray and a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the central pan to the end wall, the bottom of the fluid distribution troughs having openings therethrough, the end wall being spaced apart from a reactor wall; and a vapor-liquid distribution tray in fluid communication with the rough liquid distribution tray and with a top of a lower catalyst bed. An embodiment of the invention is one, any or all of prior embodiments in this paragraph up through the first embodiment in this paragraph wherein there is a space between adjacent fluid distribution troughs at the central pan, and wherein the space is closed by a plate. An embodiment of the invention is one, any or all of prior embodiments in this paragraph up through the first embodiment in this paragraph wherein a width of the fluid distribution troughs at the central pan is greater than a width of the fluid distribution troughs at the end wall. An embodiment of the invention is one, any or all of prior embodiments in this paragraph up through the first embodiment in this paragraph wherein a width of the fluid distribution troughs at the central pan is less than a width of the fluid distribution troughs at the end wall. An embodiment of the invention is one, any or all of prior embodiments in this paragraph up through the first embodiment in this paragraph wherein the fluid distribution troughs are less than 24 in. wide. An embodiment of the invention is one, any or all of prior embodiments in this paragraph up through the first embodiment in this paragraph further comprising a ring distributor comprising an injector for injecting quench fluid into a space above the collection tray. An embodiment of the invention is one, any or all of prior embodiments in this paragraph up through the first embodiment in this paragraph wherein the injector is directed inwardly substantially perpendicular to the ring distributor or wherein the injector is directed tangential to the ring distributor. An embodiment of the invention is one, any or all of prior embodiments in this paragraph up through the first embodiment in this paragraph further comprising a mixing chamber above the collection tray, the mixing chamber having an inner wall and an outer wall, the inner wall positioned around the central opening, the outer wall located at a position inward of the injectors, and the outer wall having a spillway. An embodiment of the invention is one, any or all of prior embodiments in this paragraph up through the first embodiment in this paragraph further comprising a vapor chimney for vapor flow positioned radially outwardly of the central opening. An embodiment of the invention is one, any or all of prior embodiments in this paragraph up through the first embodiment in this paragraph, wherein the vapor chimney extends above and below the surface of the collection tray, and wherein the vapor chimney has an upper opening above the normal operation liquid level of the collection tray and a lower opening in a lower portion of the vapor chimney. An embodiment of the invention is one, any or all of prior embodiments in this paragraph up through the first embodiment in this paragraph wherein the vapor chimney has a side and a closed bottom, the lower opening being in the side adjacent to the bottom of the vapor chimney. An embodiment of the invention is one, any or all of prior embodiments in this paragraph up through the first embodiment in this paragraph wherein the vapor chimney has an open bottom and is terminated adjacent to a lower surface of the collection tray. An embodiment of the invention is one, any or all of prior embodiments in this paragraph up through the first embodiment in this paragraph wherein a cross section of the vapor chimney is triangular. An embodiment of the invention is one, any or all of prior embodiments in this paragraph up through the first embodiment in this paragraph wherein there are a plurality of vapor chimneys arrayed circumferentially around the central opening to form fluid-flow passageways therebetween. An embodiment of the invention is one, any or all of prior embodiments in this paragraph up through the first embodiment in this paragraph wherein the vapor chimney has an inner wall adjacent to central opening and an outer wall spaced apart from the central opening and wherein a height of the inner wall is less than a height of the outer wall. An embodiment of the invention is one, any or all of prior embodiments in this paragraph up through the first embodiment in this paragraph wherein the vapor chimney is positioned above the collection tray. An embodiment of the invention is one, any or all of prior embodiments in this paragraph up through the first embodiment in this paragraph wherein the vapor chimney has an inner wall adjacent to central opening and an outer wall spaced apart from the central opening and a width of the inner wall is less than a width of the outer wall. An embodiment of the invention is one, any or all of prior embodiments in this paragraph up through the first embodiment in this paragraph further comprising a curved baffle on the collection tray between the ring distributor and the central opening. An embodiment of the invention is one, any or all of prior embodiments in this paragraph up through the first embodiment in this paragraph, further comprising at least one of a sensor positioned at a location to sense at least one parameter; a transmitter; or a computing device to receive data, analyze data, transmit data, or combinations thereof.

A second embodiment of the invention is an apparatus for the mixing and distribution of fluid between catalyst beds comprising a collection tray comprising a central opening, the collection tray in fluid communication with a bottom of an upper catalyst bed; a vapor chimney for vapor flow positioned radially outwardly of the central opening; a ring distributor comprising an injector for injecting quench fluid into a space above the collection tray; a rough liquid distribution tray comprising a central pan in fluid communication with the central opening of the collection tray and a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the central pan to the end wall, the bottom of the fluid distribution troughs having openings therethrough, the end wall being spaced apart from a reactor wall; and a vapor-liquid distribution tray in fluid communication with the rough liquid distribution tray and with a top of a lower catalyst bed.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A device for the mixing and distribution of fluid between catalyst beds comprising:
    a collection tray comprising a central opening, the collection tray in fluid communication with a bottom of an upper catalyst bed;
    a rough liquid distribution tray comprising a central pan in fluid communication with the central opening of the collection tray and a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the central pan to the end wall, the bottom of the fluid distribution troughs having openings therethrough, the end wall being spaced apart from a reactor wall; and
    a vapor-liquid distribution tray in fluid communication with the rough liquid distribution tray and with a top of a lower catalyst bed.

2. The device of claim 1 wherein there is a space between adjacent fluid distribution troughs at the central pan, and wherein the space is closed by a plate.

3. The device of claim 1 wherein a width of the fluid distribution troughs at the central pan is greater than a width of the fluid distribution troughs at the end wall.

4. The device of claim 1 wherein a width of the fluid distribution troughs at the central pan is less than a width of the fluid distribution troughs at the end wall.

5. The device of claim 1 wherein the fluid distribution troughs are less than 24 in. wide.

6. The device of claim 1 further comprising a ring distributor comprising an injector for injecting quench fluid into a space above the collection tray.

7. The device of claim 6 wherein the injector is directed inwardly substantially perpendicular to the ring distributor or wherein the injector is directed tangential to the ring distributor.

8. The device of claim 1 further comprising a vapor chimney for vapor flow positioned radially outwardly of the central opening.

9. The device of claim 8, wherein the vapor chimney extends above and below the surface of the collection tray, and wherein the vapor chimney has an upper opening above the normal operation liquid level of the collection tray and a lower opening in a lower portion of the vapor chimney.

10. The device of claim 9 wherein the vapor chimney has a side and a closed bottom, the lower opening being in the side adjacent to the bottom of the vapor chimney.

11. The device of claim 8 wherein the vapor chimney has an open bottom and is terminated adjacent to a lower surface of the collection tray.

12. The device of claim 8 wherein a cross section of the vapor chimney is triangular.

13. The device of claim 8 wherein there are a plurality of vapor chimneys arrayed circumferentially around the central opening to form fluid-flow passageways therebetween.

14. The device of claim 8 wherein the vapor chimney has an inner wall adjacent to central opening and an outer wall spaced apart from the central opening and wherein a height of the inner wall is less than a height of the outer wall.

15. The device of claim 14 wherein the vapor chimney is positioned above the collection tray.

16. The device of claim 8 wherein the vapor chimney has an inner wall adjacent to central opening and an outer wall spaced apart from the central opening and a width of the inner wall is less than a width of the outer wall.

17. The device of claim 6 further comprising a curved baffle on the collection tray between the ring distributor and the central opening.

18. A device for the mixing and distribution of fluid between catalyst beds comprising:
    a collection tray comprising a central opening, the collection tray in fluid communication with a bottom of an upper catalyst bed;
    a vapor chimney for vapor flow positioned radially outwardly of the central opening;
    a ring distributor comprising an injector for injecting quench fluid into a space above the collection tray;
    a rough liquid distribution tray comprising a central pan in fluid communication with the central opening of the collection tray and a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the central pan to the end wall, the bottom of the fluid distribution troughs having openings therethrough, the end wall being spaced apart from a reactor wall; and a vapor-liquid distribution tray in fluid communication with the rough liquid distribution tray and with a top of a lower catalyst bed.

\* \* \* \* \*